United States Patent
Nishida et al.

(10) Patent No.: US 11,769,355 B2
(45) Date of Patent: Sep. 26, 2023

(54) FAULT DIAGNOSIS SUPPORT DEVICE

(71) Applicant: HITACHI, LTD., Tokyo (JP)

(72) Inventors: Takehisa Nishida, Tokyo (JP); Mariko Okude, Tokyo (JP); Masayoshi Ishikawa, Tokyo (JP); Kazuo Muto, Tokyo (JP); Zixian Zhang, Tokyo (JP)

(73) Assignee: HITACHI, LTD., Tokyo (JP)

( * ) Notice: Subject to any disclaimer, the term of this patent is extended or adjusted under 35 U.S.C. 154(b) by 582 days.

(21) Appl. No.: 16/959,575

(22) PCT Filed: Nov. 21, 2018

(86) PCT No.: PCT/JP2018/042958
§ 371 (c)(1),
(2) Date: Jul. 1, 2020

(87) PCT Pub. No.: WO2019/142484
PCT Pub. Date: Jul. 25, 2019

(65) Prior Publication Data
US 2021/0082213 A1    Mar. 18, 2021

(30) Foreign Application Priority Data

Jan. 16, 2018 (JP) ................. 2018-004837

(51) Int. Cl.
*G07C 5/08* (2006.01)
*G01M 17/007* (2006.01)
(Continued)

(52) U.S. Cl.
CPC ......... *G07C 5/0808* (2013.01); *G01M 17/007* (2013.01); *G08G 1/01* (2013.01)

(58) Field of Classification Search
CPC ..... G07C 5/0808; G01M 17/007; G08G 1/01; B60W 50/0205; B60W 2540/30;
(Continued)

(56) References Cited

U.S. PATENT DOCUMENTS 9,815,456 B2 * 11/2017 Wu ................ B60K 6/445
2011/0196572 A1    8/2011 Tsuchikiri et al.
(Continued)

FOREIGN PATENT DOCUMENTS

CN    102099840 B  * 11/2014 ............ B60W 40/09
EP      1997705 A1    12/2008
(Continued)

OTHER PUBLICATIONS

Extended European Search Report dated Sep. 28, 2021 for European Patent Application No. 18901625.6.
(Continued)

*Primary Examiner* — Adam R Mott
*Assistant Examiner* — Heather J Keniry
(74) *Attorney, Agent, or Firm* — Volpe Koenig

(57) ABSTRACT

A system for guiding a driver to an ideal driving pattern in order to eliminate dependency on the driver's driving pattern in a fault diagnosis of an automobile part based on automobile running data, even if the driver's driving pattern is far from the ideal driving pattern. The system comprises a fault diagnosis support device equipped with: a diagnosis model selector for outputting a diagnosis model in which, for a feature value used for an examination of an automobile part, an available range available for making a diagnosis and a reference point are stipulated; a driver model generator generating, as a representative point of the feature value that corresponds to a driver's driving pattern; and a recommendation model generator generating, if the representative point is outside the available range, a recommendation model in which a boundary of the available range is set as a recommendation point.

6 Claims, 6 Drawing Sheets

(51) Int. Cl.
      *G08G 1/01*         (2006.01)
      *B60W 50/02*     (2012.01)
      *B60W 40/09*     (2012.01)

(58) Field of Classification Search
      CPC ......... B60W 2555/20; B60W 2556/10; B60W 2556/45; B60W 40/09
      See application file for complete search history.

(56)                 References Cited

U.S. PATENT DOCUMENTS

| | | | |
|---|---|---|---|
| 2013/0066512 A1* | 3/2013 | Willard | F02D 41/2403 |
| | | | 701/29.1 |
| 2015/0025731 A1* | 1/2015 | Uehara | B60W 50/14 |
| | | | 701/23 |
| 2018/0286153 A1* | 10/2018 | Muto | G07C 5/0808 |
| 2019/0066406 A1* | 2/2019 | Sarwar | G07C 5/085 |

FOREIGN PATENT DOCUMENTS

| | | | | |
|---|---|---|---|---|
| JP | 2009-234442 A | | 10/2009 | |
| JP | 2009-294004 A | | 12/2009 | |
| JP | 2011034208 A | * | 2/2011 | .......... G06F 11/0709 |
| JP | 2015-176285 A | | 10/2015 | |
| JP | 2017-013743 A | | 1/2017 | |
| JP | 2017013743 A | * | 1/2017 | |
| WO | 2010-041382 A1 | | 4/2010 | |

OTHER PUBLICATIONS

International Search Report, PCT/JP2018/042958, dated Feb. 12, 2019, 2 pgs.

\* cited by examiner

| DIAGNOSIS TARGET PART | ENVIRONMENTAL CONDITION | DIAGNOSTIC MODEL |
|---|---|---|
| ENGINE | EXPRESSWAY | MODEL A |
| ENGINE | DURING TRAFFIC JAM | MODEL B |
| BRAKE | URBAN AREA, DURING TRAFFIC JAM | MODEL C |
| ⋮ | ⋮ | ⋮ |

51, 52, 53

FEATURE VALUE X  FEATURE VALUE Y  FEATURE VALUE Z

FAULT DIAGNOSIS SUPPORT DEVICE

TECHNICAL FIELD

The present invention relates to a fault diagnosis support device that supports acquisition of running data required for fault diagnosis of an automobile.

BACKGROUND ART

There is a known method of diagnosing fault of automobile parts and their signs based on running data. The running data is highly dependent on a driving manner of the driver, and only running data difficult to use for fault diagnosis or the like may be acquired depending on the driving manner. In order to avoid this, it is desirable to guide the driver to drive in a driving pattern from which running data easy to use for fault diagnosis or the like can be acquired, and to diagnose the fault or the like more accurately.

As a technique for guiding a driver to a desired driving pattern, there is a technique described in PTL 1.

For example, the paragraph 0091 of PTL 1 discloses: "(1) Using the individual driver model and the best driver model allows the information processing system 20 to compare the driving operation predicted to be performed by the driver of the vehicle 2 and the driving operation predicted to be performed when the best driver drives the vehicle 2; (2) As a result of the comparison, the information processing system 20 can present a driving operation instruction based on the difference to the driver model; and (3) Receiving the instruction preceding the driving operation to be performed allows the driver to perform driving operation copying that of the best driver."

CITATION LIST

Patent Literature

PTL 1: JP 2009-234442 A

SUMMARY OF INVENTION

Technical Problem

However, since PTL 1 does not assume a driver whose normal driving pattern is far from the driving pattern of the best driver, it is considered that it may be difficult in skill or stressful for such a driver to approach the presented driving pattern.

Thus, it is an object of the present invention to provide a fault diagnosis support device that newly generates a driving pattern (recommendation model) from which running data that can be used for diagnosis is obtained and in which the load on the driver is also small when the normal driving pattern of the driver is far from the optimal driving pattern for diagnosis.

Solution to Problem

In order to solve the above problems, one of the fault diagnosis support devices of the present invention includes: a diagnostic model selection means configured to output a diagnostic model in which a feature value used for diagnosis of a vehicle part is defined by an available range and a reference point available for diagnosis; a driver model generation means configured to generate, as a driver model, a representative point of the feature value corresponding to a driving pattern of a driver; and a recommendation model generation means configured to generate a recommendation model in which a boundary on the representative point side of the available range is set as a recommendation point when the representative point is outside the available range.

Advantageous Effects of Invention

According to the fault diagnosis support device of the present invention, when a normal driving pattern of a driver is far from the optimal driving pattern for diagnosis, it is possible to generate a new driving pattern (recommendation model) closer to the normal driving pattern of the driver within a range where the running data available for diagnosis can be acquired. Then, driving so as to approach the presented new driving pattern (recommendation model) allows the driver to achieve driving in which the desired running data can be acquired within the range of skill without stress.

DESCRIPTION OF EMBODIMENTS

Hereinafter, embodiments of the present invention will be described with reference to the drawings.

First Embodiment

A fault diagnosis support device 1 according to a first embodiment of the present invention will be described with reference to FIGS. 1 to 10.

Figure 1:
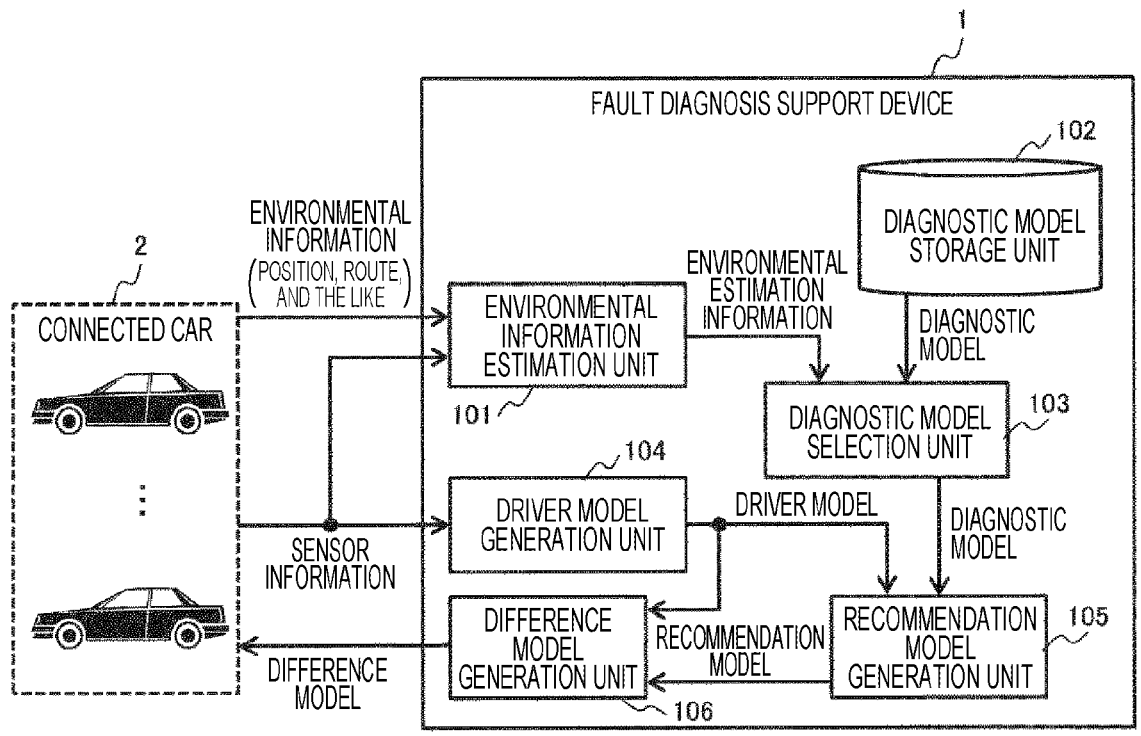
FIG. 1 is a configuration diagram of a fault diagnosis support device according to a first embodiment.

FIG. 1 is a configuration diagram of a fault diagnosis support device 1 of the present embodiment connected to a connected car 2 via a network. As shown here, the fault diagnosis support device 1 is connected to a plurality of connected cars 2, environmental information including the position and route of each car and sensor information on the vehicle are input from each connected car 2, and a difference model described below is output to the connected car 2.

In addition, as shown in FIG. 1, the fault diagnosis support device 1 includes an environmental information estimation unit 101, a diagnostic model storage unit 102, a diagnostic model selection unit 103, a driver model generation unit 104, a recommendation model generation unit 105, and a difference model generation unit 106. These functions are achieved by loading a program recorded in an auxiliary storage device such as a hard disk, which is included in the fault diagnosis support device 1, into a main storage device such as a semiconductor memory to execute the program with an arithmetic device such as a CPU, and hereinafter will be described while such well-known operations are appropriately omitted.

The environmental information estimation unit 101 estimates the vehicle environment of the connected car 2 from the environmental information/sensor information input from the connected car 2 and outputs it as environmental estimation information. The environmental estimation information includes, in addition to positional information and route information of each vehicle, weather information, temperature information, road surface condition information, road congestion condition information, road type information, and the like. The weather, temperature, and road surface condition may be recognized by a sensor such as a vehicle-mounted camera included in the vehicle of the connected car 2, or weather information and road surface information at the route point may be acquired via the Internet or the like. The road congestion condition may be determined based on the average moving speed based on the positional information and speed information of the vehicle transmitted from the connected car 2, or the road congestion information at the route point may be acquired via the Internet or the like. The road type is acquired from the map information based on the route information.

The diagnostic model storage unit 102 stores a diagnostic model required for a diagnosis for each automobile part in association with a name of a diagnosis target part and environmental information.

Figure 2:
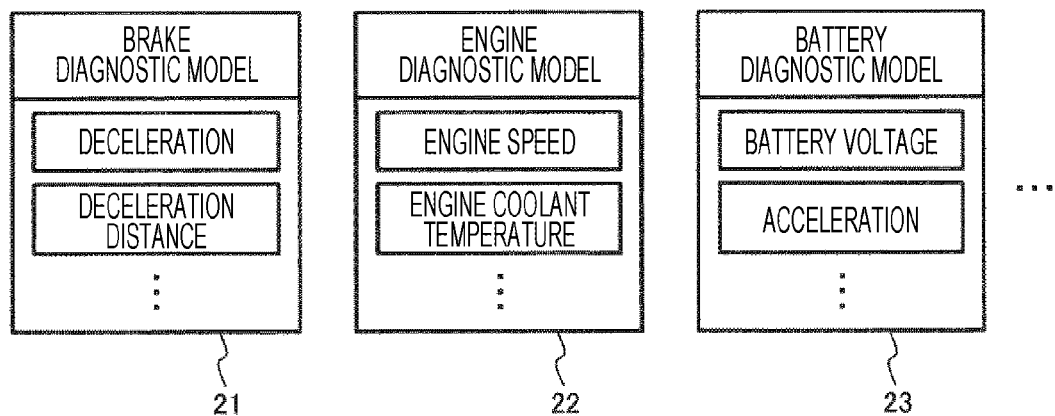
FIG. 2 is a diagram showing an example of feature values of a diagnostic model according to the first embodiment.

Here, details of the diagnostic model stored in the diagnostic model storage unit 102 will be described with reference to FIG. 2. FIG. 2 exemplifies the feature values of three types out of a large number of diagnostic models stored in the diagnostic model storage unit 102. For example, in the brake diagnostic model 21 used for the brake diagnosis, "deceleration", "deceleration distance", and the like are set as the feature values. Similarly, in the engine diagnostic model 22, "engine speed" and "engine coolant temperature" are feature values, and in the battery diagnostic model 23, "battery voltage" and "acceleration" are feature values. Here, one type of diagnostic model is exemplified for each diagnosis target part, but a plurality of diagnostic models having different combinations of feature values may be prepared for each diagnosis target part. It should be noted that for each feature value, it is suited to use a feature value obtained directly from the sensor information of the connected car 2, but an estimated value obtained by calculation from the condition of the physical characteristics such as the motion model of the vehicle may be used as a feature value.

Figure 3:
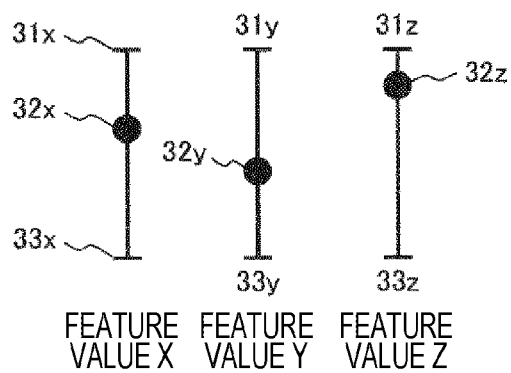
FIG. 3 is a diagram showing an example of the diagnostic model according to the first embodiment.

FIG. 3 is an example of a diagnostic model used when a diagnosis is made by independently evaluating each feature value. As in this example, in the case of a diagnostic model including three types of feature values X, Y, and Z, the reference value 32 (32$x$, 32$y$, 32$z$) most suitable for diagnosis, and the upper limit 31 (31$x$, 31$y$, 31$z$) and lower limit 33 (33$x$, 33$y$, 33$z$) available for diagnosis are set for each feature value. It should be noted that the reference value 32 does not have to be the center of the upper limit 31 and the lower limit 33.

Figure 4:
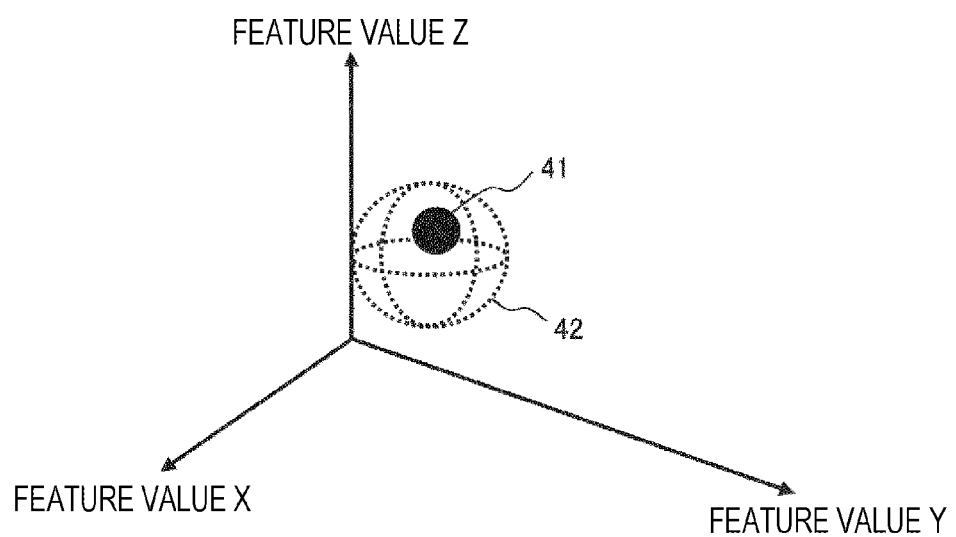
FIG. 4 is a diagram showing an example of the diagnostic model according to the first embodiment.

On the other hand, FIG. 4 is an example of a diagnostic model used when a diagnosis is made by collectively evaluating each feature value. This diagnostic model is also a diagnostic model including three types of feature values X, Y, and Z, and reference values 41 that are the coordinates in the multidimensional space of the reference value of each feature value, and a hyperspherical surface 42 (FIG. 4 shows an ordinary spherical surface because of three-dimensionality) representing the upper and lower limits of each feature value are set. This diagnostic model differs from the diagnostic model in FIG. 3 in that the upper limit and the lower limit of another feature value change according to each feature value. It should be noted that the reference value 41 does not have to be the center of the hyperspherical surface.

The reference values, the upper limits, and the lower limits in the diagnostic model in FIGS. 3 and 4 may be set empirically according to the presence or absence of a fault or a fault sign in the past fault diagnosis and the result of the diagnosis availability, or may be theoretically set based on physical constraint conditions or specifications of automobile parts.

Figures 5, 6:
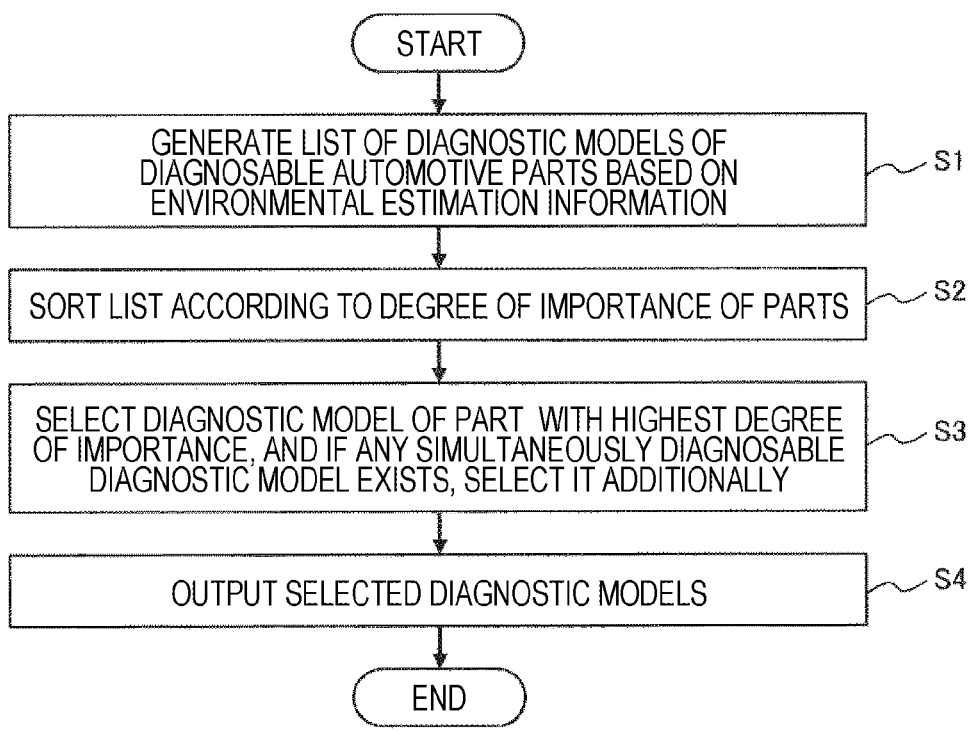
FIG. 5 is a diagram showing an example of part selection information managed in a diagnostic model storage means according to the first embodiment.
FIG. 6 is a flowchart showing the operation of a diagnostic model selection unit in the first embodiment.

Next, an example of data management in the diagnostic model storage unit 102 will be described with reference to FIG. 5. As shown here, in the diagnostic model storage unit 102, part selection information that is a combination of three types of data of column 51 "diagnosis target part", column 52 "environmental condition", and column 53 "diagnostic model" is managed. In the example shown in the diagram, from the first and second part selection information, regarding the diagnosis target part "engine", it can be seen that two diagnostic models are prepared of "model A" suitable for diagnosis in the environmental condition "expressway" and "model B" suitable for diagnosis in the environmental condition "during traffic jam".

In addition, from the third part selection information, regarding the diagnosis target part "brake", it can be seen that "model C" corresponding to the environmental condition "urban area, during traffic jam" is prepared. In this way, the environmental condition suitable for diagnosis and the diagnostic model in that case are associated with each diagnosis target part, and managed.

Returning to FIG. 1 again, the description of the other elements of the fault diagnosis support device 1 will be continued.

The diagnostic model selection unit 103 selects an automobile part to be diagnosed corresponding to the environmental estimation information based on the part selection information stored in the diagnostic model storage unit 102, and outputs a diagnostic model of the automobile part.

Details of the operation of the diagnostic model selection unit 103 will be described with reference to FIG. 6.

First, in S1, a list of diagnostic models of diagnosable automobile parts is generated based on the environmental estimation information that is an output of the environmental information estimation unit 101. For example, if the environmental estimation information is "urban area, during traffic jam, sunny", in the example in FIG. 5, the diagnostic model "model B" of the diagnosis target part "engine" corresponding to the environmental condition "during traffic jam" and the diagnostic model "model C" of the diagnosis target part "brake" corresponding to the environmental condition "urban area, during traffic jam" are selected; and a list "[model B, model C]" listing these is generated.

Next, in S2, the list is sorted according to the degree of importance of the parts. The degree of importance of parts is preset from the viewpoint of the designer, and for example, if the brake is set to be more important than the engine, the original list "[model B, model C]" is sorted into a new list "[model C, model B]" that prioritizes "model C" related to "brake".

In S3, in the case where the diagnostic model of a part with the highest degree of importance is selected, when there is a diagnostic model diagnosable at the same time, this is also additionally selected. Here, "diagnosable at the same time" means that there is no overlap of feature values between diagnostic models. In the case of the example of the list "[model C, model B]" sorted in S2, if there is no overlap in the feature values between model B and model C, model B is also selected in addition to model C.

In S4, the selected diagnostic model is output. In the example of S3, since the model B and the model C are selected, these two driver models for diagnosis are output.

Returning to FIG. 1 again, the description of the other elements of the fault diagnosis support device 1 will be continued.

The driver model generation unit 104 generates a driver model for expressing the features of the driving manner of the driver based on the sensor information transmitted from the connected car 2. This driver model generates a representative point for each feature value shown in FIG. 2 (deceleration, engine speed, and the like) based on the sensor information obtained from the vehicle of the connected car 2, and unlike those in FIGS. 3 and 4, has only a representative point for each feature value.

Based on both models of the diagnostic model selected by the diagnostic model selection unit 103 and the driver model generated by the driver model generation unit 104, the recommendation model generation unit 105 generates a new driver model resembling the driver model of the driver and available for diagnosis as a recommendation model, and outputs the new driver model. It should be noted that this recommendation model is a driving pattern generated when the driving pattern of the driver deviates from the diagnostic model, and is a driving pattern from which the running data available for diagnosis can be obtained and in which the skillful and stressful load on the driver is also small.

Figure 7:
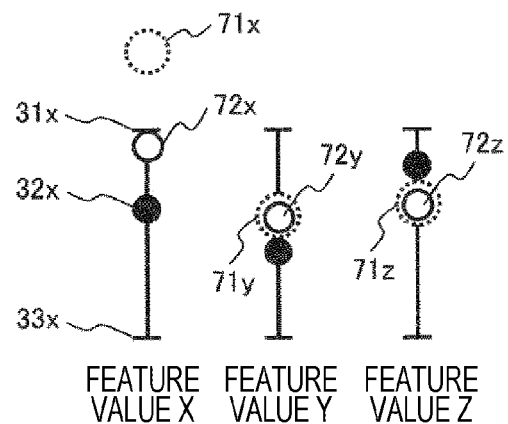
FIG. 7 is a diagram showing an example of generation of a recommendation model according to the first embodiment.
Figure 8:
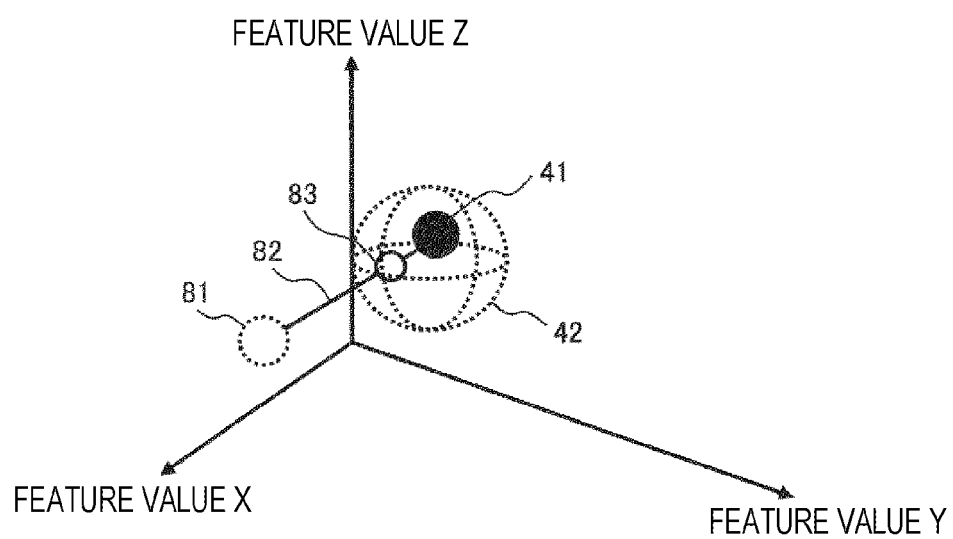
FIG. 8 is a diagram showing an example of generation of a recommendation model according to the first embodiment.

An example of a recommendation model generated by the recommendation model generation unit 105 will be shown with reference to FIGS. 7 and 8.

FIG. 7 is an example of a method for generating a recommendation model based on the diagnostic model in FIG. 3. With respect to the feature values X, Y, and Z of the diagnostic model, the driver model of the driver has representative points 71x, 71y, and 71z, respectively. Of these points, since exceeding the upper limit 31x of the diagnostic model, the representative point 71x cannot be used for diagnosis. Thus, the recommendation model generation unit 105 sets the upper limit 31x to the recommendation point 72x. On the other hand, since the representative points 71y and 71z are within the range of the upper limit 31 and the lower limit 33 of the diagnostic model, the recommendation model generation unit 105 sets the representative points 71y and 71z to the recommendation points 72y and 72z as they are. With these pieces of processing, the recommendation model generation unit 105 generates and outputs a recommendation model including the recommendation points 72x, 72y, 72z any of which fall within the available range of the feature values.

In addition, FIG. 8 is an example of a method for generating a recommendation model based on the diagnostic model in FIG. 4. In this example, the recommendation model generation unit 105 connects the reference value 41 of the diagnostic model and the representative point 81 of the driver model of the driver with a straight line 82, generates a recommendation model in which an intersection of the straight line 82 and the hyperspherical surface 42 is set as recommendation point 83, and outputs the recommendation model Generating the recommendation model by the method described above allows a recommendation model closest to the driver model of the driver to be generated within the diagnosable range even if the reference value of the diagnostic model and the representative point of the driver model of the driver are apart from each other. Then, driving according to this recommended model makes it possible to acquire running data available for diagnosis while reducing the skillful and stressful load on the driver as much as possible.

The difference model generation unit 106 generates and outputs the difference between the driver model of the driver output by the driver model generation unit 104 and the recommendation model output by the recommendation model generation unit 105 as a difference model. This difference model will be shown with reference to FIGS. 9 and 10.

Figure 9:
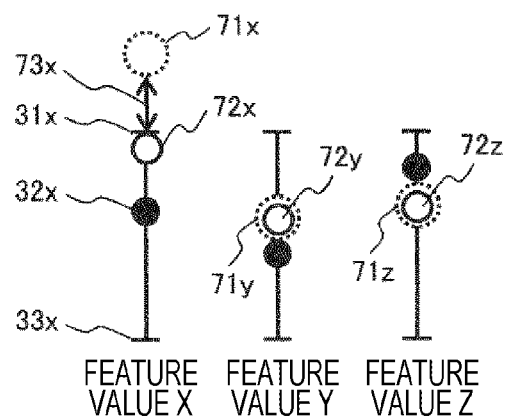
FIG. 9 is a diagram showing an example of generation of a difference model in the first embodiment.

FIG. 9 is an example of obtaining a difference model based on the recommendation model in FIG. 7. As described above, regarding the feature value Y and the feature value Z, since the representative points 71y and 71z of the driver model of the driver and the recommendation points 72y and 72z match, the differences obtained by the difference model generation unit 106 are zero. On the other hand, regarding the feature value X, since the representative point 71x of the driver model of the driver exceeds the recommendation point 72x, the difference model generation unit 106 outputs only the difference 73x related to the feature value X as a difference model. For example, when the feature value X is "speed", the representative point 71x of the driver model of the driver is "30 km/h", and the recommendation point 72x is "20 km/h", the difference model generation unit 106 outputs a difference model of "−10 km/h" regarding the feature value "speed".

Figure 10:
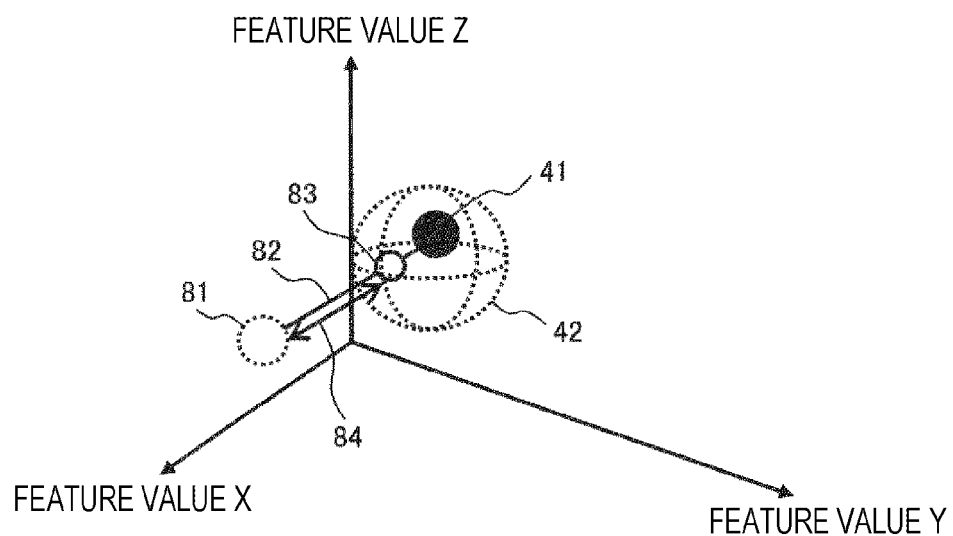
FIG. 10 is a diagram showing an example of generation of a difference model in the first embodiment.

In addition, FIG. 10 is an example of obtaining a difference model based on the recommendation model in FIG. 8. The difference model generation unit 106 can generate a difference model by obtaining a component for each feature value with respect to the difference 84 between the representative point 81 of the driver model of the driver and the recommendation point 83. In the case of the diagram, the components related to the feature value Y and the feature value Z are zero, and only the component related to the feature value X is output as a difference model ("−10 km/h" according to the example in FIG. 9).

The difference model generated as shown in FIGS. 9 and 10 is transmitted to the connected car 2, and for example, is presented on a display device of the driver's seat as in "Please decelerate by 10 km/h for diagnosing the engine."

Then, driving according to that causes the driving pattern of the driver to approach the recommendation model, and using the sensor information or the like collected at that time allows the desired diagnosis target part to be appropriately diagnosed.

As described above, according to the fault diagnosis support device of the present embodiment, it is possible to easily generate a recommendation model available for diagnosis and close to the actual driving manner. Then, transmitting the difference between this recommendation model and the driver model based on the actual driving of the driver to the connected car makes it possible to guide the driver to a driving pattern in which the load on the driver is small and which is suitable for part diagnosis.

Second Embodiment

Figure 11:
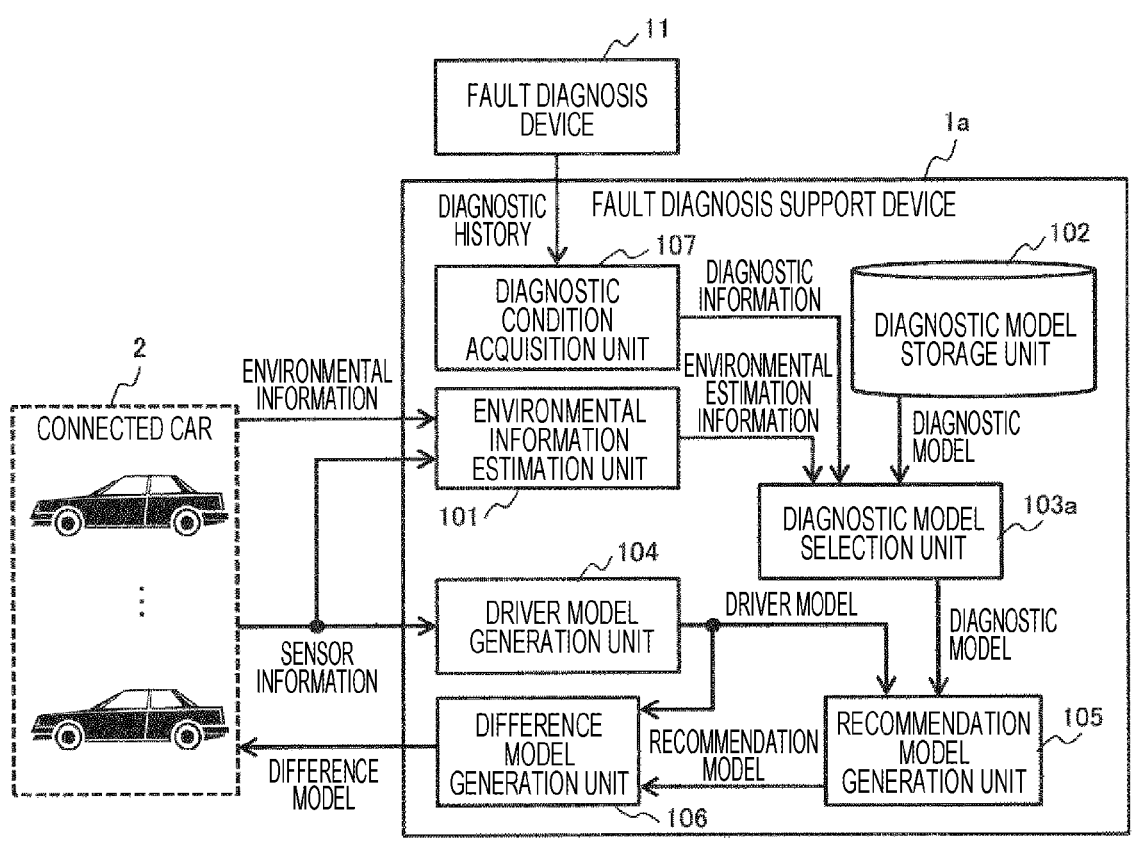
FIG. 11 is a configuration diagram of a fault diagnosis support device according to a second embodiment.

Next, a fault diagnosis support device 1a according to a second embodiment of the present invention will be described with reference to FIG. 11. It should be noted that overlapping description is omitted for the common points with the first embodiment.

The fault diagnosis support device 1a of the present embodiment is obtained by improving the diagnostic model selection function of the diagnostic model selection unit 103 of the first embodiment; and differs from the fault diagnosis support device 1 of the first embodiment in including a diagnostic condition acquisition unit 107 connected to the fault diagnosis device 11, and in replacing the diagnostic model selection unit 103 with the diagnostic model selection unit 103a connected to the diagnostic condition acquisition unit 107.

The fault diagnosis device 11 of the present embodiment diagnoses a fault or a sign of fault of the vehicle of the connected car 2 and outputs the diagnosis history. It should be noted that although not shown, the fault diagnosis device 11 acquires sensor information and environmental information as running data from the vehicle of the connected car 2 and makes the diagnosis.

The diagnostic condition acquisition unit 107 receives the diagnosis history output from the fault diagnosis device 11 as input, and generates and outputs diagnosis information such as the diagnosis frequency of the diagnosis part.

Based on, in addition to the environmental estimation information output by the environmental information estimation unit 101 and the diagnostic model stored in the diagnostic model storage unit 102, the diagnostic information output by the diagnostic condition acquisition unit 107, the diagnostic model 103a selects a predetermined diagnostic model from a plurality of diagnostic models. That is, it is possible to select an appropriate diagnostic model by taking into account the diagnostic condition of each part in addition to the degree of importance of the diagnosis target part, and the function of the diagnostic model is improved. Thus, it becomes possible to generate a list of diagnostic models in consideration of diagnostic intervals and diagnostic frequencies, such as lowering the degree of importance of the diagnostic model of the recently diagnosed diagnosis target part and raising the degree of importance of the diagnostic model of the diagnosis target part that has not been diagnosed for a long time.

With the fault diagnosis support device in the above-described first and second embodiments, generating a model close to the driver model of the driver as a recommendation model within the diagnosable range and outputting the difference allows the vehicle of the connected car 2 to assist driving based on the received difference model, such as guiding the driver to a target speed. This reduces the burden on the driver to follow the guidance. Furthermore, it becomes possible to reduce the dependence on the driving pattern of the driver in the running data necessary for the fault diagnosis of the automobile parts.

In addition, in the above-described first and second embodiments, the fault diagnosis device has been described on the premise of a connected car in which a driver intervenes, but a connected car having a self driving function in which a driver does not always intervene may be used. In this case, the self-driving vehicle has only to be driven by applying the difference model to the driver model of the own vehicle based on the difference model that is the output result of the fault diagnosis support device 1.

Furthermore, in the first and second embodiments, the fault diagnosis device is connected to the connected car, and the sensor information, the environmental information, and the difference model are transferred via the network, but the fault diagnosis device may be mounted on each vehicle.

It should be noted that the present invention is not limited to the configurations of the embodiments described above, and includes various modifications. For example, the above-described embodiments are described in detail for easy understanding of the present invention, and are not necessarily limited to those including all the configurations described. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments. In addition, each of the above-described configurations, functions, processing units, processing means, and the like may be partially or entirely achieved by hardware by, for example, designing with integrated circuits. In addition, each of the above-described configurations, functions, and the like may be achieved by software by interpreting and executing a program that achieves each function by the processor. Information such as a program, a table, and a file for achieving each function can be placed in a recording device such as a memory, a hard disk, or a solid state drive (SSD), or a recording medium such as an IC card, an SD card, or a DVD.

REFERENCE SIGNS LIST

1, 1a fault diagnosis support device
2 connected car
11 fault diagnosis device
21 brake diagnostic model
22 engine diagnostic model
23 battery diagnostic model
31, 31x, 31y, 31z upper limit
32, 32x, 32y, 32z, 41 reference value
33, 33x, 33y, 33z lower limit
42 hyperspherical surface
71, 71x, 71y, 71z, 81 representative point
72, 72x, 72y, 72z, 83 recommendation point
73, 73x, 73y, 73z, 84 difference
82 straight line
101 environmental information estimation unit
102 diagnostic model storage unit
103, 103a diagnostic model selection unit
104 driver model generation unit
105 recommendation model generation unit
106 difference model generation unit
107 diagnostic condition acquisition unit
X, Y, Z feature value

The invention claimed is:

1. A device for detecting a fault in one or more system(s) of an automobile, the device comprising:
 a plurality of sensors that measure parameters of the one or more system(s) of the automobile; and
 a memory that stores a plurality of diagnostic models in which an available range and a reference point available for diagnosis are defined for a feature value used for diagnosis of the one or more system(s) of the automobile;
 wherein the device is configured to:
 determine an environmental condition based in part on the parameters of the one or more system of automobile measured, wherein the environmental condition indicates a condition of roadway where the automobile is being operated;

determine a driver model based on environmental condition, wherein the driver model includes a representative point of the feature value for one or more systems of the automobile under the environmental condition;

select a particular diagnostic model from among the plurality of the diagnostic models based on the driver model;

generate a recommendation model based on the particular diagnostic model and the environmental condition, and detect the fault in the one or more system of the automobile by comparing the recommendation model to the parameters of the one or more system of the automobile.

2. The device according to claim 1, wherein the available range is defined by a hyperspherical surface.

3. The device according to claim 1,
wherein the memory further stores a plurality of pieces of part selection information in which a vehicle part, the environmental condition, and respective diagnostic models among the plurality of diagnostic models are associated with each other.

4. The device according to claim 3,
wherein the plurality of diagnostic models each include a diagnostic frequency or a diagnostic interval for each one of the one more systems of the automobile.

5. The device according to claim 1, wherein the one or more systems of the automobile includes at least one of an engine system, a braking system and a battery system.

6. The device according to claim 1, wherein the condition of the roadway includes at least one of an expressway, a traffic jam, or an urban area.

* * * * *